Dec. 28, 1926.

J. A. YOUNG

REVERSING GEAR

Filed August 25, 1924

Inventor

JOHN A. YOUNG.

By Lyon+Lyon

Attorneys

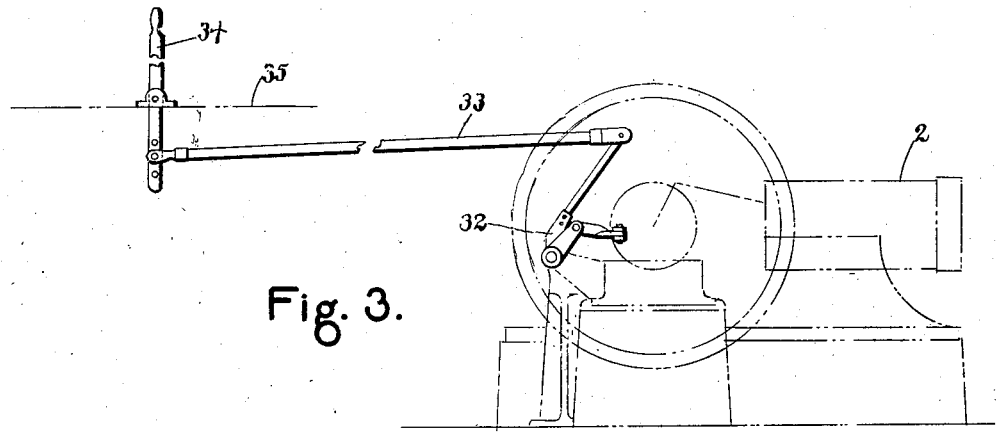
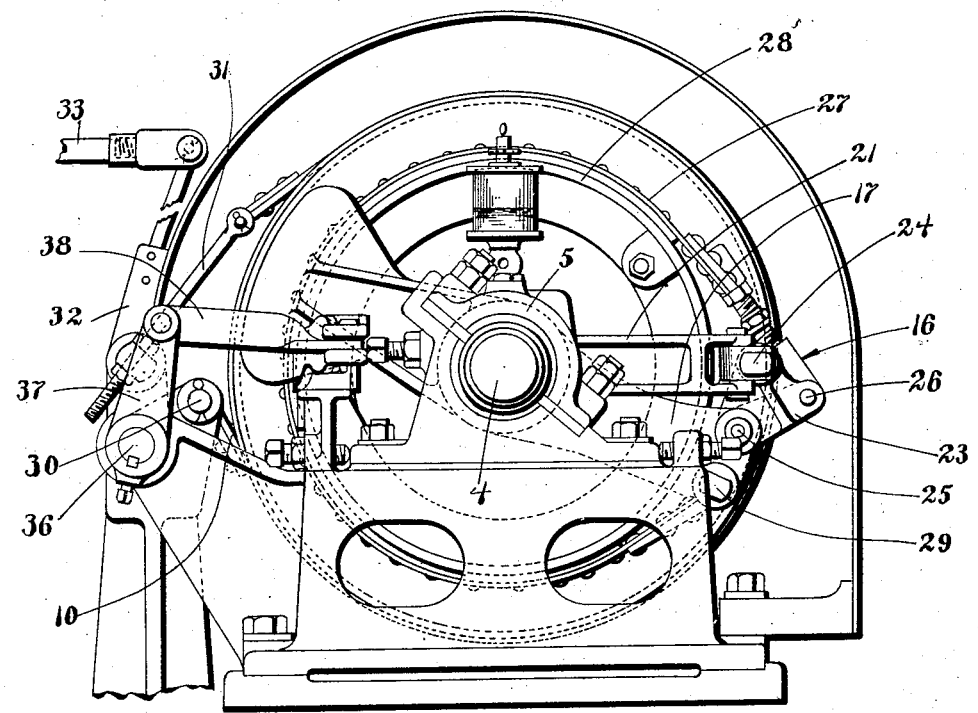

Patented Dec. 28, 1926.

1,612,248

UNITED STATES PATENT OFFICE.

JOHN A. YOUNG, OF TORRANCE, CALIFORNIA, ASSIGNOR TO UNION TOOL COMPANY, OF TORRANCE, CALIFORNIA, A CORPORATION OF CALIFORNIA.

REVERSING GEAR.

Application filed August 25, 1924. Serial No. 733,966.

This invention relates to a reversing gear for reversing the drive from an engine or the like. Such reversing gears are used as part of the equipment connected with a gas engine in connection with the operation of oil wells. This type of reversing gear involves the use of a shaft on which the belt pulley is mounted. The general object of this invention is to provide simple means for connecting the pulley to the shaft at will to enable the pulley to be driven in the forward direction by the engine, together with simple means for effecting the driving of the pulley at will in a reverse direction; also to provide a mechanism which can be readily adapted for driving the pulley at different reverse speeds; also to provide a construction of this kind in which the reversing drive will be automatically connected when the direct drive connection is open or disconnected, and vice versa.

Further objects of the invention will appear hereinafter.

The invention consists in the novel parts and combination of parts to be described hereinafter, all of which contribute to produce an efficient reversing gear.

A preferred embodiment of the invention is described in the following specification, while the broad scope of the invention is pointed out in the appended claims.

In the drawings:—

Fig. 2 is an end elevation of this apparatus, as viewed from the right end, certain parts being broken away.

Fig. 3 is a diagrammatic view illustrating the general arrangement and the relation of the engine cylinder and the control lever to the other parts of the mechanism.

Figure 1:
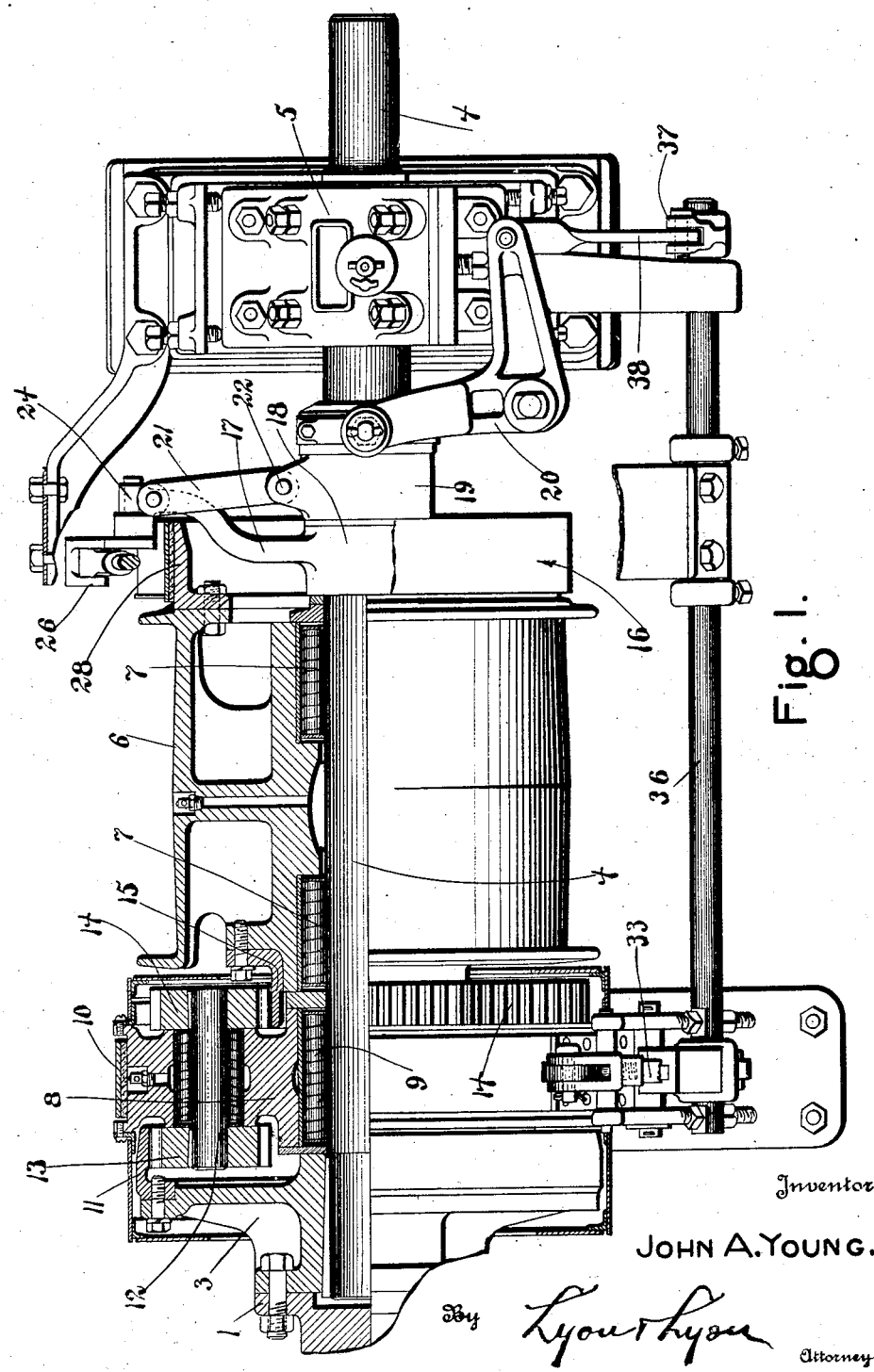
Figure 1 is a plan and partial section of a reversing gear embodying my invention, certain parts being broken away.

In Figure 1, 1 represents a coupling flange which is keyed directly to the shaft of the engine 2 (see Figure 3). This flange 1 is bolted to a driving member 3 which is rigidly mounted on the shaft 4, the said shaft being mounted in a suitable bearing 5 toward its other end. On the shaft 4 a pulley 6 is rotatably mounted and in the present instance this pulley is mounted on roller bearings 7.

In practicing my invention, I provide means operatable at will for connecting the pulley to the shaft to enable the pulley to be driven directly by the shaft. I also provide a brake ring rotatably mounted on the shaft with means carried by the brake ring for transmitting rotation from the driving member to the pulley; a brake band on the brake ring is operatable at will for holding the same fixed to drive the pulley in reverse direction when the direct driving means is disconnected.

Adjacent to one end of the pulley 6 I provide a brake ring 8 which is rotatably mounted on a roller bearing 9 on the shaft 4. I prefer to provide gears and pinions for driving the pulley 6 through this brake ring 8 when the same is held fixed by means of a brake band 10 which lies on the face of this brake ring. For this purpose I provide the driving member 3 with a gear ring 11 which may be bolted to it, as shown. Within the brake ring I mount two pinion drives, each pinion drive comprising a pinion shaft 12 with a pinion 13 at one end meshing with the gear ring 11, and also the pinion 14 at the other end meshing with a gear ring 15 which is bolted to the adjacent end of the pulley 6. With this construction, it will be evident that if the brake band 10 is applied to the brake ring 8 so as to keep it from rotating, then the rotation of the driving member 3 will be imparted through the pinions 13 and 14 to the pulley 6, but in a reverse direction.

It will also be evident that by providing gear rings such as the gear rings 11 and 15, of various diameters, the ratio of the drive between the driving member 3 and the pulley 6 may be altered, as may be desired.

In order to connect the shaft 4 at will to drive the pulley 6 directly in a forward direction from the engine, I prefer to provide means at the other end of the pulley for making this connection from the shaft. At this point I prefer to provide a clutch 16 (see Figure 2) which clutch may be of any desired type, but I prefer to use a clutch of the general type illustrated in my copending application Serial No. 690,523. This clutch includes a radial arm 17 integral with the hub 18 which is keyed to the shaft 4, and on the shaft near this hub 18 a sliding collar 19 is provided, controlled by a bell crank lever 20. When the bell crank lever 20 is moved in a direction to slide the collar 19 toward the hub 18, a strut link 21, pivotally attached at 22 to the collar, thrusts outwardly and rocks a rocker 23 (see Figure 2) to which the outer end of the link 21 is attached by means of a knuckle connection 24. This rocker plate 23 is pivotally attached at 25 on the end of the arm 17 and at the point 26 is pivotally connected with a brake band 27 which is disposed on the outer face of a brake flange 28 which is bolted to the adjacent end of the pulley (see Figures 1 and 2). The other end of the brake band 27, which is in two sections, is attached at 29 to another point on the arm 17. With this organization of parts it will be evident that when the strut link 21 thrusts outwardly the brake band will be tightened so as to enable the shaft 4 to drive the pulley 6 directly and in a forward direction.

One end of the lower section of the brake band 10 is anchored on a fixed pin 30 (see Figure 2) and the corresponding end of the upper section of the brake band is connected to a threaded stem 31 which is attached to a lever 32. This lever may be operated at will by a link 33 connected to a control lever 34 on the derrick floor 35 (see Figure 3.)

I provide a connection between the lever 32 and the bell crank lever 20 so that when the clutch 16 is applied, the brake band 10 will be held out of contact with the brake ring 8, and this mechanism operates automatically in such a way that when the brake band 10 is tight on the brake ring 8, the clutch 16 will open. In order to accomplish this I mount the lever 32 on a shaft 36 which extends longitudinally of the mechanism, and near the clutch 16 this shaft is provided with an arm 37 which is connected by a link 38 with the bell crank lever 20.

With this organization of parts, it will be evident that when the control lever 34 is held in one extreme position, the engine can drive the pulley 6 through the clutch 16 in a forward direction, and when the control lever 34 is held in its opposite extreme position, the pulley 6 will be driven in the reverse direction.

If desired the pinion shafts such as shaft 12 may be provided each with a roller bearing as illustrated.

It is understood that the embodiment of the invention described herein is only one of the many embodiments this invention may take, and I do not wish to be limited in the practice of the invention, nor in the claims, to the particular embodiment set forth.

What I claim is:

1. In a reversing gear, the combination of a shaft, a belt pulley mounted to rotate on the shaft, a clutch for connecting the pulley to the shaft to enable the pulley to be driven directly by the shaft, a driving gear rigid with the shaft, a brake-ring between the driving gear and the pulley rotatably mounted on the shaft, pinions with shafts parallel to the pulley's axis, carried by the brake-ring for transmitting rotation from the driving gear to the pulley, the pinions adjacent the pulley being located beyond the end of the pulley, a brake-band on the brake-ring operatable at will for holding the same fixed to drive the pulley in reverse direction, a rock shaft extending longitudinally with the first shaft, means connecting the same with the clutch for closing the same when the rock shaft is rocked in one direction, means connecting the rock shaft with the brake-band to hold the brake-ring against rotation when the rock shaft is rocked in the other direction, and a lever for rocking the rock shaft.

2. In a reversing gear, the combination of a shaft, a belt pulley mounted to rotate on the shaft, a clutch for connecting the pulley to the shaft to enable the pulley to be driven directly by the shaft, a driving member rigid with the shaft and having a gear ring bolted thereto with gear teeth on the inner side of the gear ring, a brake ring between the driving member and the pulley rotatably mounted on the shaft, pinions with shafts parallel to the pulley's axis, carried by the brake ring and meshing with the gear ring, pinion shafts on the other pinions carried on the other side of the brake ring, said last named pinions being located beyond the end of the pulley, a gear ring attached to the end of the pulley adjacent the last named pinions and meshing with them on the side toward the shaft whereby rotation of the driving member can be imparted through the pinions to the pulley, a brake band on the brake ring operable at will for holding the same fixed to drive the pulley in a reverse direction, and means for connecting the brake band and the clutch operating to open the clutch when the brake band is applied.

Signed at Torrance, Calif., this 16th day of August, 1924.

JOHN A. YOUNG.